(12) United States Patent
Hayden et al.

(10) Patent No.: US 10,273,937 B2
(45) Date of Patent: Apr. 30, 2019

(54) COMPOSITE MEMBER

(71) Applicant: Blade Dynamics Limited, Southhampton (GB)

(72) Inventors: Paul Trevor Hayden, Winchester (GB); Harald Behmer, Newport (GB)

(73) Assignee: BLADE DYNAMICS LIMITED, Hampshire (GB)

( * ) Notice: Subject to any disclaimer, the term of this patent is extended or adjusted under 35 U.S.C. 154(b) by 379 days.

(21) Appl. No.: 15/166,849

(22) Filed: May 27, 2016

(65) Prior Publication Data
US 2016/0348644 A1 Dec. 1, 2016

(30) Foreign Application Priority Data

May 28, 2015 (GB) .................................. 1509153.1

(51) Int. Cl.
*F03D 13/10* (2016.01)
*B32B 3/02* (2006.01)
(Continued)

(52) U.S. Cl.
CPC ............ *F03D 1/0683* (2013.01); *B29C 65/48* (2013.01); *B29C 65/483* (2013.01);
(Continued)

(58) Field of Classification Search
CPC ............. F03D 1/0683; B29C 66/12261; B29C 66/721
See application file for complete search history.

(56) References Cited

U.S. PATENT DOCUMENTS

2010/0278654 A1* 11/2010 Kyriakides ........... F03D 1/0675
416/226
2012/0082557 A1* 4/2012 Baker ................... F03D 1/0675
416/241 R
(Continued)

FOREIGN PATENT DOCUMENTS

EP 2153964 A1 2/2010
GB 1236229 A 6/1971
(Continued)

OTHER PUBLICATIONS

Great Britain Search Report issued in connection with corresponding GB Application No. 15091531 dated Nov. 18, 2015.
(Continued)

*Primary Examiner* — Woody A Lee, Jr.
(74) *Attorney, Agent, or Firm* — GE Global Patent Operation; Douglas D. Zhang

(57) ABSTRACT

A composite member comprises first and second elongate composite elements. Each has a wedge shaped end with a complimentary tapered end surface. At least one of the components is formed of a stack of fiber layers impregnated in resin, with the tapered end surface being formed by each fiber layer extending longitudinally progressively further than the adjacent layer towards the thin end of the wedge at which the fiber layers have the greatest longitudinal extent. The components are joined at their tapered ends by an adhesive, and the properties of the cured composite material of the at least one component and/or the properties of the adhesive are different in the vicinity of the thin end of the wedge as compared to the rest of the tapered surface in order to reduce the stress concentrations in this region.

7 Claims, 3 Drawing Sheets

(51) Int. Cl.
    *F03D 1/06*         (2006.01)
    *B29C 65/48*      (2006.01)
    *B29C 65/50*      (2006.01)
    *B29C 65/00*      (2006.01)
    *B29C 70/06*      (2006.01)
    *B29C 70/30*      (2006.01)
    *B32B 5/26*       (2006.01)
    *B29L 31/08*      (2006.01)

(52) U.S. Cl.
    CPC ...... *B29C 65/5014* (2013.01); *B29C 65/5064* (2013.01); *B29C 66/1162* (2013.01); *B29C 66/12261* (2013.01); *B29C 66/12822* (2013.01); *B29C 66/12842* (2013.01); *B29C 66/43* (2013.01); *B29C 66/721* (2013.01); *B29C 70/06* (2013.01); *B29C 70/30* (2013.01); *B32B 3/02* (2013.01); *B32B 5/26* (2013.01); *F03D 13/10* (2016.05); *B29C 66/7212* (2013.01); *B29C 66/73751* (2013.01); *B29C 66/73753* (2013.01); *B29L 2031/085* (2013.01); *B32B 2250/20* (2013.01); *B32B 2260/023* (2013.01); *B32B 2260/046* (2013.01); *B32B 2603/00* (2013.01); *F05B 2230/23* (2013.01); *F05B 2280/6003* (2013.01); *Y02E 10/721* (2013.01); *Y02P 70/523* (2015.11)

(56) References Cited

U.S. PATENT DOCUMENTS

| | | | |
|---|---|---|---|
| 2012/0132344 A1* | 5/2012 | Deleris | B29C 73/10 156/98 |
| 2016/0047252 A1* | 2/2016 | Merzhaeuser | B29C 70/00 416/229 A |
| 2016/0341178 A1* | 11/2016 | Jorgensen | B29D 99/0025 |
| 2017/0021575 A1* | 1/2017 | Hansen | F03D 1/0675 |

FOREIGN PATENT DOCUMENTS

| | | | | |
|---|---|---|---|---|
| WO | 9220954 | A1 | 11/1992 | |
| WO | 2009030228 | A1 | 3/2009 | |
| WO | 2012004571 | A2 | 1/2012 | |
| WO | 2013010979 | A2 | 1/2013 | |
| WO | WO-2013010979 | A2 * | 1/2013 | ........... F03D 1/0675 |
| WO | 2014096002 | A2 | 6/2014 | |

OTHER PUBLICATIONS

European Search Report & Written Opinion issued in connection with Corresponding EP Application No. 16171529.7 dated Oct. 4, 2016.

* cited by examiner

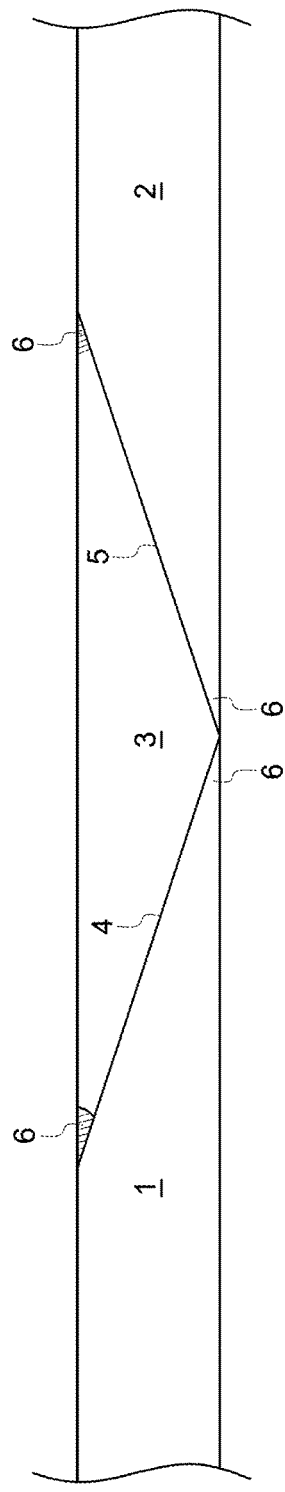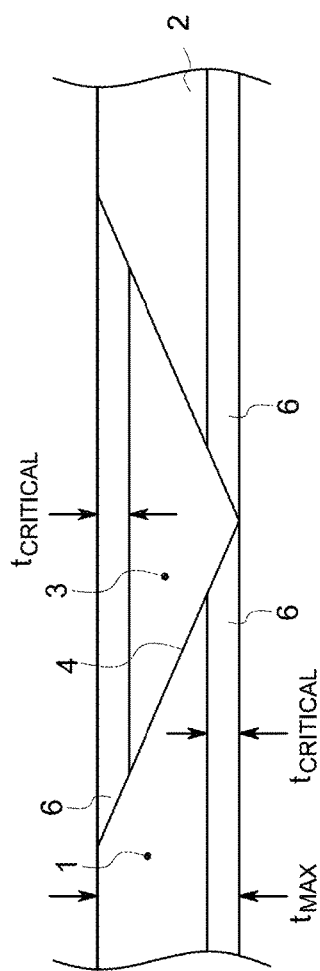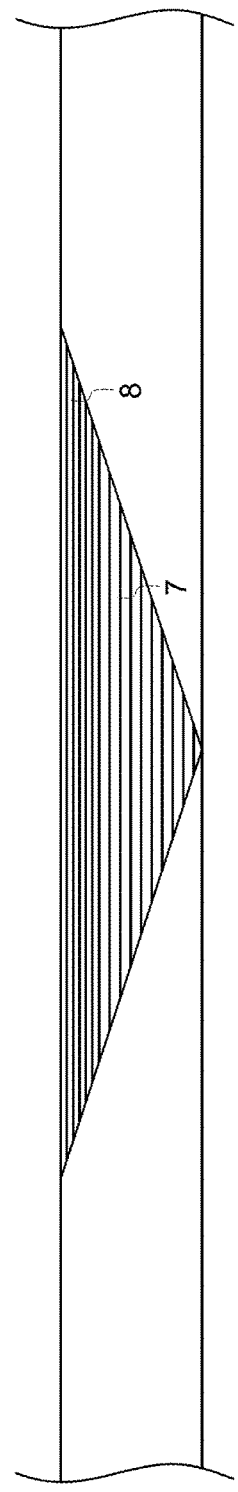
FIG. 1
FIG. 2
FIG. 3

COMPOSITE MEMBER

BACKGROUND

Embodiments of the present invention relate to a composite member.

In particular, it is directed to a composite member comprising first and second elongate composite elements, each having a wedge shaped end with a complimentary tapered end surface; at least one of the components being formed of a stack of fibre laminates impregnated in resin, the tapered end surface being formed by each fibre layer extending longitudinally progressively further than the adjacent layer towards the thin end of the wedge at which the fibre layers have the greatest longitudinal extent; the components being joined at their tapered ends by an adhesive.

Such a composite member is disclosed in WO 2012/004571. This document discloses a "double-scarf" joint which can join together the two spar cap sections of adjacent components of a wind turbine blade. These spar caps can either be joined "in situ" allowing large wind turbine blades to be assembled close to their point of use. Alternatively, it discloses a method of joining spar cap components in the factory environment. In an embodiment, double scarf spar cap joints are highly beneficial. They allow wind turbine blades to be made of a number of small components which are assembled into more complex sub-assemblies. They also allow the sub-assemblies to be jointed together simply and securely potentially in a non-factory environment in a manner which does not significantly increase the parasitic mass of the joint.

BRIEF SUMMARY OF THE INVENTION

The present invention relates to an improvement of such a joint. The concept has broader application to other fields beyond wind turbine blade spar caps where a secure joint is required between two elongate composite components.

An important feature of a scarf joint is the "scarf angle". This is the angular inclination of the inclined surface forming the joint surface. If the angle is relatively steep, the longitudinal distance between the termination of each stack of fibres at the joint surface is small thereby concentrating the stress distribution over a relatively small longitudinal length. On the other hand, a scarf angle which is too shallow can create practical problems as the longitudinal extent of the scarf joint is significant. Further, such a joint is vulnerable to failure at the thin ends of the composite components, particularly with brittle adhesives. Related to this is the potential problem of resin starvation. This is caused by resin being unable to sufficiently penetrate the thin ends such that the fibres are not wetted out, or because the resin flows away from this region during the curing process. This resin starvation can potentially exacerbate the above-mentioned problems of peeling at the thin ends.

According to the present invention, a composite member of the kind described is characterised in that the properties of the cured composite material of at least one component and/or the properties of the adhesive are different in the vicinity of the thin end of the wedge as compared to the rest of the tapered surface in order to reduce the stress concentrations in this region.

The present invention is therefore able to improve the quality of the joint by specifically targeting the thin ends of the composite component where, for the reasons given above, the problems are greatest. However, by specifically targeting these regions, the improvements can be obtained without prohibitively increasing the cost of the joint.

The stress concentration in the thin end region may be reduced either by improving the quality of the joint leading to a reduction in defects and hence a reduction in stress concentration. Alternatively, the stress concentration may be reduced by distributing the stress more evenly as set out below in relation to the ply layer.

The ways in which the properties are different may be one or more selected from the following group: fibre layer thickness, fibre/resin volume, fibre material, resin material, longitudinal spacing between fibre layers and adhesive material.

By reducing the fibre layer thickness, effectively by using thinner plies in the vicinity of the thin end of the wedge, the step height between each layer is reduced. For example, 600 gsm uniaxial fibre reinforcement could be replaced with 300 gsm uniaxial fibre reinforcement. As the step height is reduced, the strength of the scarf joint is improved because the stress concentrations at the ply drop-offs are reduced. As the step height reduces, the scarf joint surface becomes smoother and approaches the "ideal" scarf joint surface (i.e. one which is devoid of any steps). The reduction of stress concentrations at ply drop-offs is particularly important at the thin end of the wedge where the size of stress concentration relative to the thickness of the fibre layers is greater. If there is a defect at the end of the fibre layer, it has less of an impact for thinner plies. The scarf angle can be maintained by increasing the number of steps and reducing the step thickness.

It is also possible to change the scarf angle in the thin end by increasing the step length (i.e. the longitudinal distance between steps). Changing the scarf angle in the thin end can protect against failure in the thin end of the wedge, particularly when materials with different stiffnesses are being joined.

The fibre/resin volume ratio can be adjusted in order to address the problem of resin starvation. The resin content of the plies in the thin end of the wedge can be locally increased. This reduces the probability of dry fibres and the associated reduced mechanical properties improving quality by reducing defects.

The different materials in the thin ends may be tailored to reduce the stress concentrations. For example, the stiffness, strength and toughness of the fibres or resin may be increased towards the thin end. The use of different materials in the thin end may be designed to improve failure of the adhered surfaces which can become the dominating failure mode. Alternatively, it may simply be the use of higher quality, higher cost material in order to improve performance. For example, the longitudinal modulus of the composite may be changed by replacing standard modulus carbon fibre with intermediate modulus carbon fibre. This could change the longitudinal modulus of the composite from 140 Gpa to 160 Gpa (typical values). Other changes to the carbon fibres could be using different modulus fibres (low, standard, high, ultra high), strengths, precursors (PAN, pitch, rayon) or heat treatment methods. The fibre material type could also be changed with potential fibres for the thin end including carbon, glass (E-glass, S-glass, R-glass), aramid (Kevlar) or basalt. Toughening mechanisms could be improved by modifying the interfacial bond or changing the properties of the matrix and/or reinforcement. Toughness can be improved via the addition elastomeric or thermoplastic compounds (such as rubber particles), or interlayer material between plies (such as lightweight nonwoven veils).

The adhesive properties may be changed, for example to use a more ductile adhesive to limit crack growth.

Additional constituents can be included in the composite material including particles, nano-material and interlayers. One possibility is to have resin only layers interleaved with composite layers which assists in dealing with the above-mentioned resin-starvation issue. The additional constituents may be included to improve the toughness of the composite, or provide it with self-healing capabilities.

The key requirement is that these additional materials can be used in the thin ends of the wedge because this is the critical region for joint integrity and the additional expense associated with any such measures can be justified by the improved performance.

The different properties of the composite in the vicinity of the thin end of the wedge may extend across the full longitudinal length of the composite element. For example, in the case of a "double-scarf" joint there is a relatively short connection piece (which represents one of the elongate components referred to above) which bonds to a spar cap. Because the connection piece has a relatively short longitudinal extent, and has two thin ends, it may be simplest to extend the different material across the full length of the connection piece. Alternatively, the different properties may only extend longitudinally a relatively short distance away from the thin end such that they do not extend across the full length of the composite component. Ultimately, the decision is driven by a cost/benefit analysis of whether the additional cost of increasing the longitudinal extent of the different materials across the full length of the composite element is justified or whether it is more effective to terminate this a short distance away from the thin end.

In the broadest sense, the invention requires that only one of the elongate components is provided with the different properties as defined above. Such an arrangement may be useful if only one end of the joint is particularly vulnerable to failure at the thin end. However, more particularly, both of the first and second elongate composite components are provided with the different properties so that the joint can be enhanced at both of the thin ends.

The present invention has broad application to joining any two elongate composite components. However, more particularly, the elongate composite components are part of the spar cap for use in a wind turbine blade.

The elongate components may be two spar cap elements. Alternatively, the first elongate component may be a spar cap element and the second elongate component may be a connection piece joined at one end to the first component and at an opposite end to a third component which is a second spar cap element.

According to a second aspect of the present invention there is provided a method of forming a composite member according to a first aspect of the present invention, the method comprising applying adhesive to at least one of the tapered end surfaces, bringing the tapered end surfaces together and curing the composite material and adhesive.

BRIEF DESCRIPTION OF THE DRAWINGS

An example of a member and method in accordance with the present invention will now be described with reference to the accompanying drawings, in which:

FIG. 1 is a cross-section of a composite member;
FIG. 2 is a schematic cross-section of part of the composite member;
FIG. 3 shows one implementation of the invention.

DETAILED DESCRIPTION

Figure 4:
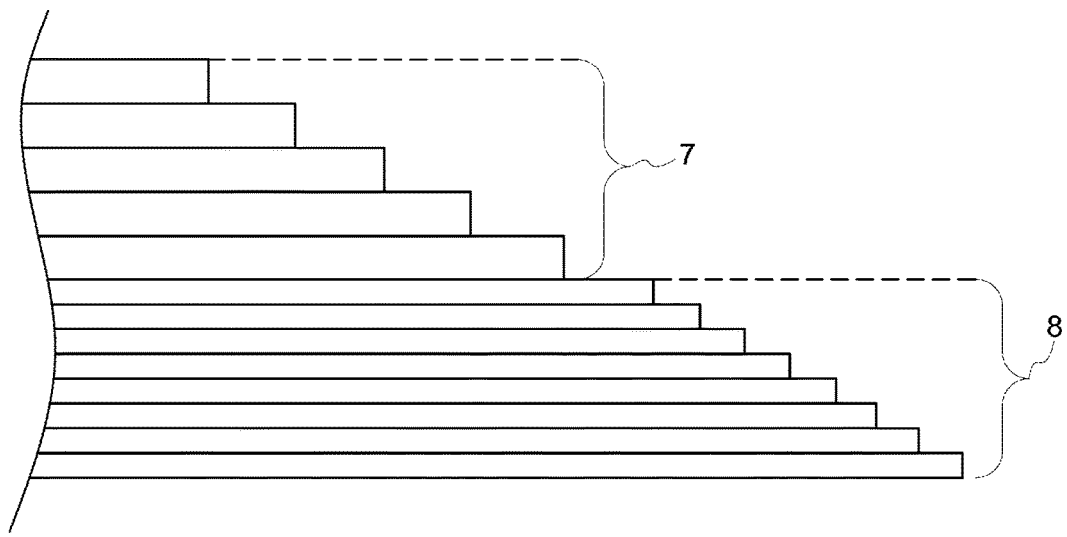
FIG. 4 shows the detail of the implementation of FIG. 3.

The composite member shown in FIG. 1 is broadly as shown in WO 2012/004571. The description below will describe this as a spar cap member for a wind turbine blade. However, this represents a joint between elongate composite members and, as such, can be applied to any such joint in the same way.

As shown in FIG. 1, there is a first spar cap member 1 and a second spar cap member 2 joined by a connection piece 3 which has a first joint interface 4 with the first spar cap member 1 and a second joint interface 5, with the second spar cap member 2.

The invention can also be applied to a joint directly between the first and second spar cap members without necessarily requiring the connection piece 3. In this case, with reference to FIG. 1, the region occupied by the connection piece 3 would effectively be an integral part of the first spar cap member 1 and there would be only a single joint interface equivalent to the first joint interface 5 where the two components would be bonded using the technique described below.

Each of the first and second spar cap members 1, 2 and the connection piece 3 is formed from a stack of fibre layers or plies impregnated with resin. Alternatively, it may be formed from one or more pultruded composite components. The end face may have a stepped configuration, or the end may be machined. The connection piece 3 may be formed as a separate component which is then placed whole into the position shown in FIG. 1. Alternatively, the connection piece 3 may be built up in situ. Both of these alternatives are described in WO 2012/004571.

Because of the tapered nature of the first and second spar cap members 1, 2, 3, each has a wedge shaped structure with a thin end 6. Similarly, the connection piece 3 has a double tapered configuration such that it has two thin ends 6.

The nature of the thin ends is shown in more detail in FIG. 2. Here, if the total thickness of the composite member is $t_{MAX}$, the thickness of the thin end is $t_{CRITICAL}$ where $t_{CRITICAL}$ is at most 20% of $t_{MAX}$. This is the region in which most problems occur in a joint of this type. It should be noted that there is no need for any of the improvement proposed by the invention to extend for the full 20% of the thickness. Depending on the nature of the improvement, it may be possible for the improvement to extend to a greater or lesser extent. Nevertheless, the important aspect of the invention is that the improvement is focused in this thin end region and is absent from a thicker part of the component.

The tapered components may be made in one of two ways. The inclined end surface may be created by machining the composite component. However, this creates practical challenges as the machined surfaces can be difficult to align and have poor adhesive thickness tolerances. Therefore, in an embodiment, the inclined surfaces are created by dropping off plies so that each extends progressively further than an adjacent layer into the thin end.

A difficulty with creating ply drop-offs in this way is that the termination of each layer of fibres is a potential source of stress concentration.

FIG. 3 shows an arrangement of fibre layers to accommodate this effect. The fibre layers are shown in the connection piece 3, but it will be appreciated that a similar but inverted configuration can also apply to the first and second spar cap members 1, 2. In this case, the fibre plies 7 for the bulk of the thickness of the connection piece 3 have a first thickness and the second plies 8 in the vicinity of the thin end 6 have a second thickness which is less than the first thickness. The thinner plies 8 extend across the full width of the connection piece. This does not necessarily need to be the case as, away from the thin ends 6, the closest spacing is unnecessary. However, it is not worth replacing these thinner plies with wider plies given the short nature of the connection piece 3. These considerations are likely to be different for the much longer first and second spar cap members.

FIG. 4 shows the variation of the ply layer in greater detail. Each layer represented in FIG. 4 shows a pre-preg layer comprising partially cured resin and a single layer of fibres which are uniaxial fibres extending in the longitudinal direction. The adjacent component will be provided with an inverted complimentary surface. A layer of adhesive would be applied to one of the surfaces and the two components would be brought together and cured.

Figure 5:
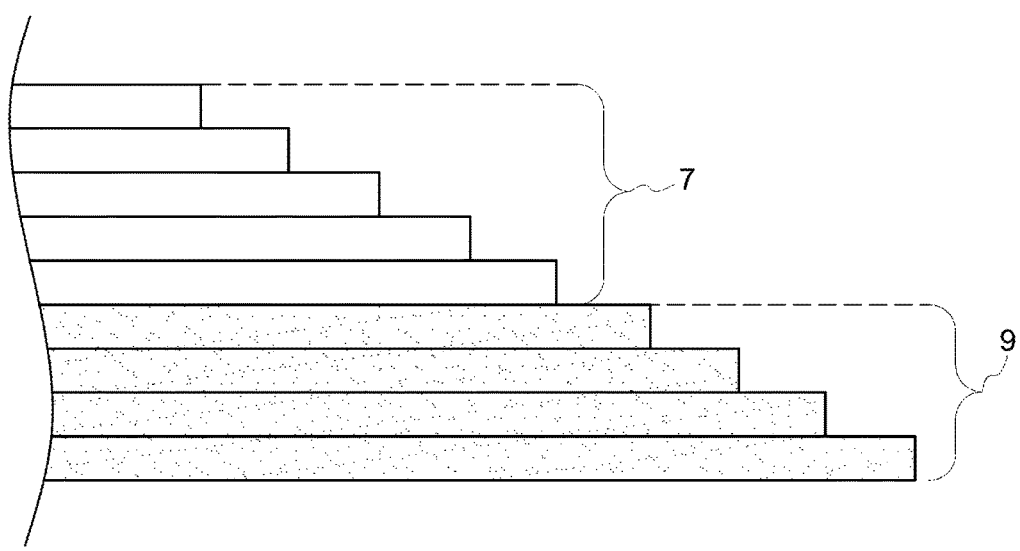
FIG. 5 is similar to FIG. 4 showing a detail of a second implementation.

FIG. 5 shows an alternative to FIG. 4. In this case, rather than reducing the thickness of the ply in the vicinity of the thin edge, this time the material is different. Thus, the plies 7 for the bulk of the thickness of the component remain the same. However, second plies 9 in the vicinity of the thin end are formed from a different material. One possibility is to form these second plies 9 of a pre-preg that has a resin volume fraction which is between 3% and 8% higher than the resin volume fraction of the first plies 7. A typical resin volume fraction (i.e. the ratio of the volume of the resin to the total volume of the composite) is 30-34% and this would be used for the first plies. The second plies would have an increased resin volume fraction, typically between 33% and 42%. This reduces the likelihood of resin starvation in the vicinity of the thin end thereby improving the joint quality.

As an alternative to or in addition to the increased resin volume fraction, the material properties between the first 7 and second 8 ply layers may be enhanced as set out above.

Figure 6A:
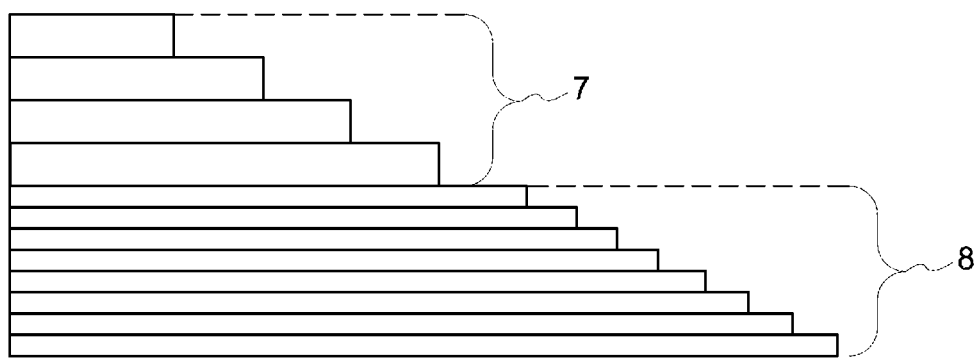
FIGS. 6A, 6B, and 6C show variations on the implementation of FIG. 4.
Figure 6B:
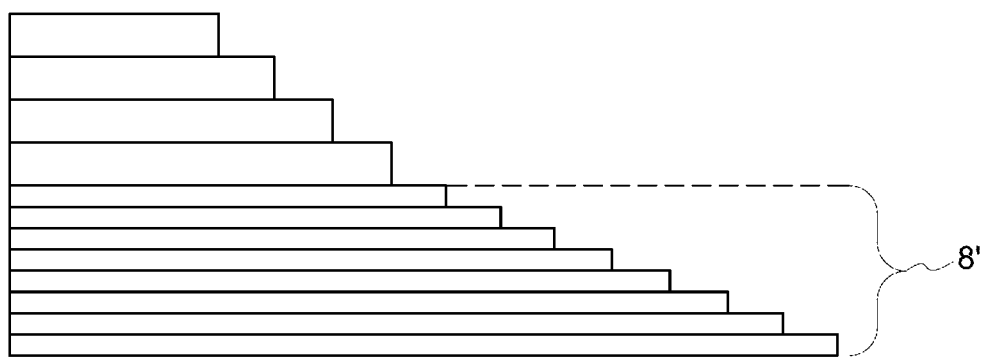
Figure 6C:
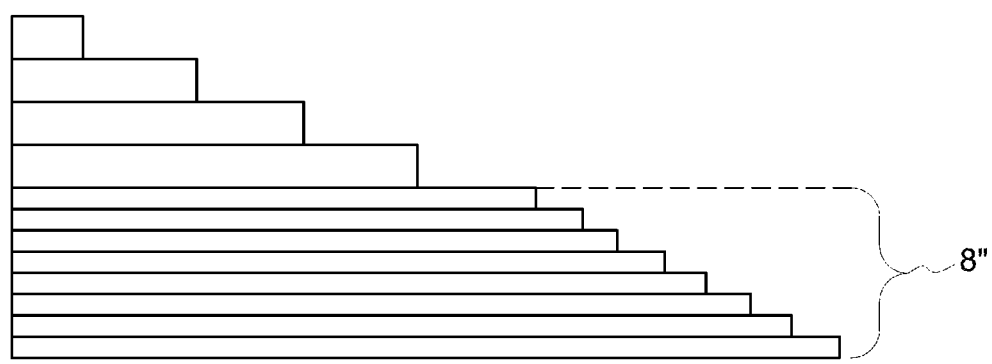

FIGS. 6A to 6C show variations of the arrangement in FIG. 4 in which, in 6A, the second plies 8 have a longitudinal spacing which maintains the same scarf angle. In FIG. 6B, the second plies 8' have an increased longitudinal spacing in order to produce a shallower scarf angle in the vicinity of the thin end, while in FIG. 6C, the second plies 8" have a shorter axial longitudinal spacing in order to have a locally increased scarf angle. Although these figures show variations in the longitudinal spacing with the thinner plies, the variation in spacing could be also implemented with the same thickness plies as the remainder of the component.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A composite member comprising:
   a first elongate composite element; and
   a second elongate composite element,
   wherein each elongate composite element comprises a wedge shaped end with a complimentary tapered end surface; at least one of the first elongate composite element or the second elongate composite element being formed of a stack of fibre layers impregnated in resin, the respective tapered end surface being formed by each fibre layer extending longitudinally progressively further than a previous adjacent fibre layer towards a thin end of the wedge shaped end, at which the fibre layers have the greatest longitudinal extent; the first elongate composite element and the second elongate composite element being joined at their tapered end surfaces by an adhesive;
   wherein properties of a cured composite material of the at least one of the first elongate composite element or the second elongate composite element or properties of the adhesive are different in the vicinity of the thin end of the wedge shaped end as compared to the rest of the tapered end surface in order to reduce stress concentrations in the thin end.

2. The composite member according to claim 1, wherein the properties of the cured composite material may be one or more selected from the following group: fibre layer thickness, fibre/resin volume, fibre material, resin material, and longitudinal spacing between fibre layers.

3. The composite member according to claim 2, wherein the different properties in the vicinity of the thin end of the wedge shaped end extend across the full longitudinal length of the at least one of the first elongate composite element or the second elongate composite element.

4. The composite member according to claim 1, wherein the different properties in the vicinity of the thin end of the wedge shaped end do not extend across the full longitudinal length of the at least one of the first elongate composite element or the second elongate composite element.

5. The composite member according to claim 1, wherein the composite member is a spar cap for use in a wind turbine blade.

6. The composite member according to claim 5, wherein the first elongate composite element is a spar cap element, and the second elongate composite element is a connection piece joined at one end to the first elongate composite element and at an opposite end to a third element which is a second spar cap element.

7. A method of forming a composite member according to claim 1, the method comprising applying the adhesive to at least one of the tapered end surfaces, bringing the tapered end surfaces together and curing the composite material and the adhesive.

* * * * *